US009236922B2

(12) United States Patent
Park et al.

(10) Patent No.: US 9,236,922 B2
(45) Date of Patent: Jan. 12, 2016

(54) METHOD OF COMMUNICATING BETWEEN BASE STATION AND TERMINAL BASED ON INTERFERENCE ALIGNMENT IN MULTI-CELL MULTI-USER MULTIPLE-INPUT MULTIPLE-OUTPUT (MIMO) INTERFERENCE CHANNEL AND METHOD AND APPARATUS OF COMMUNICATION USING INTERFERENCE ALIGNMENT AND BLOCK SUCCESSIVE INTERFERENCE PRE-CANCELLATION IN MULTI-USER MULTIPLE-INPUT MULTIPLE-OUTPUT INTERFERENCE CHANNEL

(71) Applicant: ELECTRONICS AND TELECOMMUNICATIONS RESEARCH INSTITUTE, Daejeon (KR)

(72) Inventors: Jae Hyun Park, Busan (KR); Sung Jin Yoo, Daejeon (KR); Myung Sun Song, Daejeon (KR); Byung Jang Jeong, Daejeon (KR); Jae Ick Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 166 days.

(21) Appl. No.: 13/845,760

(22) Filed: Mar. 18, 2013

(65) Prior Publication Data

US 2013/0267266 A1 Oct. 10, 2013

(30) Foreign Application Priority Data

Apr. 4, 2012 (KR) .......................... 10-2012-0034903
Sep. 25, 2012 (KR) .......................... 10-2012-0106294
Feb. 27, 2013 (KR) .......................... 10-2013-0021362

(51) Int. Cl.
*H04B 15/00* (2006.01)
*H04B 7/04* (2006.01)

(52) U.S. Cl.
CPC .................................. *H04B 7/0456* (2013.01)

(58) Field of Classification Search
CPC .. H04B 7/0617; H04B 7/0417; H04B 7/0626; H04B 7/022; H04B 7/024; H04B 7/0443; H04B 7/0632; H04B 1/62; H04B 7/0413; H04B 7/043; H04B 7/0434; H04B 7/0452; H04B 7/0456; H04B 7/086; H04L 25/03343; H04L 1/0029; H04L 2025/03808; H04L 1/20; H04L 25/03891; H04L 1/0026; H04L 1/06; H04L 25/0204; H04L 25/0242; H04L 25/0246; H04L 25/0248; H04L 5/0035; H04W 52/04; H04W 52/40; H04W 28/0231; H04W 28/048; H04W 52/42; H04W 52/50; H04W 72/082; H04W 72/121; H04W 72/1226; H04W 72/1231; H04W 24/10; H04W 28/22
See application file for complete search history.

(56) References Cited

U.S. PATENT DOCUMENTS

| 2010/0226293 | A1 | 9/2010 | Kim et al. | |
|---|---|---|---|---|
| 2011/0159881 | A1 | 6/2011 | Shin et al. | |
| 2011/0319092 | A1* | 12/2011 | Kim et al. | 455/452.1 |
| 2012/0040701 | A1* | 2/2012 | Tong et al. | 455/501 |

FOREIGN PATENT DOCUMENTS

| KR | 1020100112754 A | 10/2010 |
|---|---|---|
| KR | 1020110024219 A | 3/2011 |

* cited by examiner

*Primary Examiner* — Golam Sorowar
(74) *Attorney, Agent, or Firm* — Ladas & Parry LLP

(57) ABSTRACT

A communication method of a base station and a terminal based on interference alignment in a multi-cell multi-user multiple-input multiple-output (MIMO) interference channel and a method and apparatus of communication using interference alignment and block successive interference pre-cancellation in a multi-user MIMO interference channel. The base station may determine a precoding matrix to maximize a signal to interference and noise ratio (SINR) and a signal to leakage and noise ratio (SLNR) in the interference channel, and a terminal communicating with the base station may determine a decoding matrix to align interference. The transmitter including a multicell interference channel may calculate a rotation matrix for interference alignment, identify effective symbol vectors using the rotation matrix, and generate a transmit signal of a target transmitter to pre-cancel interference corresponding to a transmit signal of a neighboring transmitter.

5 Claims, 11 Drawing Sheets

METHOD OF COMMUNICATING BETWEEN BASE STATION AND TERMINAL BASED ON INTERFERENCE ALIGNMENT IN MULTI-CELL MULTI-USER MULTIPLE-INPUT MULTIPLE-OUTPUT (MIMO) INTERFERENCE CHANNEL AND METHOD AND APPARATUS OF COMMUNICATION USING INTERFERENCE ALIGNMENT AND BLOCK SUCCESSIVE INTERFERENCE PRE-CANCELLATION IN MULTI-USER MULTIPLE-INPUT MULTIPLE-OUTPUT INTERFERENCE CHANNEL

CROSS-REFERENCE TO RELATED APPLICATION

This application claims the priority benefit of Korean Patent Application No. 10-2012-0034903, filed on Apr. 4, 2012, Korean Patent Application No. 10-2012-0106294, filed on Sep. 25, 2012, and Korean Patent Application No. 10-2013-0021362, filed on Feb. 27, 2013, in the Korean Intellectual Property Office, the disclosure of which is incorporated herein by reference.

BACKGROUND

1. Field of the Invention

Exemplary embodiments relate to a communication method of a base station and a terminal based on interference alignment in a multi-cell multi-user multiple-input multiple-output (MIMO) interference channel.

Also, exemplary embodiments relate to a method and apparatus for communication using interference alignment and block successive interference pre-cancellation in a multi-user MIMO interference channel.

2. Description of the Related Art

With an increase in data communication services, more interference signals are being transmitted from a plurality of terminals and access points (APs). Accordingly, the data communication services are faced with limitations in increasing communication capacity and communication quality deterioration.

Conventionally, an increased number of APs is employed to deal with poor communication areas or increase communication capacity. However, as a number of APs reaches a threshold or greater and a size of a cell is reduced, an influence of interference signals transmitted from adjacent APs increases remarkably. Recently, extensive studies are being conducted on wireless communication in a small cell such as a micro-cell or a femto-cell.

However, a cell planning technique to reuse an existing frequency or a multiple-input multiple-output (MIMO) scheme using multiple antennas, both of which are directed to decreasing interference, has a limitation in terms of controlling the interference.

In addition, although an interference alignment technique using multiple antennas to increase cell capacity has been suggested, the interference alignment technique involves a great amount of channel information to calculate an interference alignment weight and a substantial amount of calculation.

Conversely, with an increase in data communication service users, more interference signals between multiple transmitters and multiple receivers are being generated. Thus, the communication capacity limit is reached and the communication quality deteriorates because of these interference signals.

To resolve these issues, an increased number of APs is conventionally employed to deal with poor communication areas or increase the communication capacity. However, as a number of APs reaches a threshold or greater, and a size of a cell is reduced, an influence of interference signals transmitted from adjacent APs increases remarkably.

Recently, an interference alignment technique using multiple antennas has been suggested to increase the cell capacity. However, the interference alignment technique remains unknown as to solutions of precoding/decoding for perfect interference alignment with any number of general antennas and terminals.

Accordingly, the present disclosure proposes to introduce pre-cancellation to an interference alignment technique to obtain a higher multiplexing gain or more degrees of freedom (DOF) than conventional interference alignment.

SUMMARY

An aspect of the present invention provides a communication method using interference alignment based on a maximum signal to interference and noise ratio (SINR) and a maximum signal to leakage and noise ratio (SLNR) in a multi-cell multi-user multiple-input multiple-output (MIMO) interference channel.

In particular, another aspect of the present invention also provides a technique for enabling a plurality of base stations to calculate a precoding matrix in a distributed architecture absent the base stations sharing channel information from each base station to each target terminal in a multi-cell multi-user MIMO interference channel.

Still another aspect of the present invention also provides a technique for calculating a precoding matrix for interference alignment using a non-iterative algorithm in a multi-cell multi-user MIMO interference channel, to reduce the complexity of precoding matrix calculation.

Yet another aspect of the present invention also provides a communication method and apparatus for generating a transmit signal using interference alignment and block successive pre-cancellation of a multi-user MIMO interference channel in a communication system with multi-cell interference, to improve a multiplexing gain or degrees of freedom (DOF).

According to an aspect of the present invention, there is provided a communication method of a first base station in a first cell communicating with a terminal in the first cell subject to interference by a signal transmitted from a second base station in at least one second cell, the communication method including detecting a channel matrix between antennas installed in the terminal and antennas installed in the first base station and a channel matrix between the antennas installed in the terminal and antennas installed in the second base station, detecting a channel matrix between antennas installed in at least one remaining terminal in the first cell and the antennas installed in the first base station and a channel matrix between the antennas installed in the at least one remaining terminal and the antennas installed in the second base station, and determining a precoding matrix used for communication between the first base station and the terminal based on the channel matrices in order to maximize a signal to leakage and noise ratio (SLNR) with respect to the terminal.

Here, the determining of the precoding matrix may include generating a matrix pair based on the channel matrices and a noise component in the terminal, extracting at least one generalized eigenvalue by applying generalized eigenvalue decomposition to the matrix pair, and computing the precoding matrix using an eigenvector corresponding to a greatest generalized eigenvalue among the at least one generalized eigenvalue.

The determining of the precoding matrix may include generating a matrix K based on the channel matrices and a noise component in the terminal, extracting a first QR factor and a second QR factor by applying QR decomposition to the matrix K, extracting a first singular value factor by applying singular value decomposition to the first QR factor, and computing the precoding matrix based on the second QR factor and the first singular value factor.

The communication method may further include determining a precoding matrix used for communication between the first base station and the at least one remaining terminal, detecting a precoding matrix used for communication between the second base station and at least one terminal included in the second cell, and determining a power allocation weight vector used by the first base station based on the channel matrices and the precoding matrices in order to maximize a signal to interference and noise ratio (SINR) with respect to the terminal.

The determining of the power allocation weight vector may include computing a Psi matrix based on the channel matrices and the precoding matrices, extracting at least one eigenvalue by applying eigenvalue decomposition to the Psi matrix, and computing the power allocation weight vector using an eigenvector corresponding to a greatest eigenvalue among the at least one eigenvalue.

According to another aspect of the present invention, there is provided a communication method of a terminal in a first cell subject to interference by a signal transmitted from a second base station in a second cell and communicates with a first base station in the first cell, the communication method including detecting a channel matrix between antennas installed in the terminal and antennas installed in the second base station, detecting a channel matrix between antennas installed in at least one remaining terminal in the first cell and antennas installed in the first base station in the first cell and a channel matrix between the antennas installed in the at least one remaining terminal and the antennas installed in the second base station, detecting a precoding matrix used for communication between the first base station and the at least one remaining terminal and a precoding matrix used for communication between the second base station and the at least one remaining terminal included in the second cell, and determining a decoding matrix to align interference in the terminal based on the channel matrices and the precoding matrices.

The determining the decoding matrix may include detecting interference signals in the terminal, computing at least one orthogonal vector to span a null space orthogonal to effective channels of the respective interference signals, and computing the decoding matrix using the at least one orthogonal vector.

The determining of the decoding matrix may include generating a matrix Q based on the channel matrices and the precoding matrices, extracting at least one eigenvalue by applying eigenvalue decomposition to the matrix Q, and computing the decoding matrix using the at least one eigenvalue.

The precoding matrix used for communication between the first base station and the at least one remaining terminal may be determined in order to maximize a signal to leakage and noise ratio (SLNR) with respect to the least one remaining terminal, and the precoding matrix used for communication between the second base station and the at least one terminal included in the second cell may be determined in order to maximize an SLNR with respect to the least one terminal included in the second cell.

According to still another aspect of the present invention, there is provided a communication method of a transmitter for interference cancellation in a communication system having a multi-cell interference channel, the communication method including calculating a rotation matrix for transforming channel matrices from a plurality of transmitters to a plurality of receivers into a block upper triangular matrix, for interference alignment, identifying effective symbol vectors corresponding to data symbol vectors of the plurality of transmitters using the rotation matrix, and generating a transmit signal of a target transmitter using the effective symbol vector of the target transmitter and the block upper triangular matrix, to pre-cancel interference corresponding to a transmit signal of a neighboring transmitter.

The calculating of the rotation matrix for transforming the channel matrices from the plurality of transmitters to the plurality of receivers into the block upper triangular matrix for the interference alignment may include receiving information associated with a rotation matrix of the neighboring transmitter, identifying a rotation matrix of the target transmitter using the rotation matrix of the neighboring transmitter and the channel matrices from the target transmitter to the plurality of receivers, and identifying a rotation matrix for transforming the channel matrices from the plurality of transmitters to the plurality of receivers into a block upper triangular matrix using the rotation matrix of the target transmitter.

The channel matrices from the plurality of transmitters to the plurality of receivers may correspond to channel matrices arranged based on an arrangement standard using an indicator associated with the channel.

The identifying of the effective symbol vectors corresponding to the data symbol vectors of the plurality of transmitters using the rotation matrix may include identifying the data symbol vectors of the plurality of transmitters, and calculating effective symbol vectors of the plurality of transmitters using the rotation matrix and the data symbol vectors.

The generating of the transmit signal of the target transmitter using the effective symbol vector of the target transmitter and the block upper triangular matrix, to pre-cancel interference corresponding to the transmit signal of the neighboring transmitter may include calculating an inverse matrix of the block upper triangular matrix, identifying information associated with the transmit signal of the neighboring transmitter and at least one interference channel matrix of the neighboring transmitter, pre-cancelling interference corresponding to the transmit signal of the neighboring transmitter using the effective symbol vector of the target transmitter, the information associated with the transmit signal of the neighboring transmitter, and the at least one interference channel matrix of the neighboring transmitter, calculating the transmit signal of the target transmitter using information associated with the pre-cancelled interference and an inverse matrix of a channel matrix from the target transmitter to a target receiver, identifying modified effective symbol vectors of the plurality of transmitters using the effective symbol vectors, and extracting the transmit signal of the target transmitter using the modified effective symbol vectors.

The calculating of the inverse matrix of the block upper triangular matrix may include identifying a sub-matrix of the block upper triangular matrix, calculating an inverse matrix of the sub-matrix, and identifying an inverse matrix of the block upper triangular matrix using the inverse matrix of the sub-matrix and a nested structure.

The identifying of the modified effective symbol vectors of the plurality of transmitters using the effective symbol vectors may include identifying a cell index using a plurality of diagonal channel matrices of the block upper triangular matrix, and calculating the modified effective symbol vectors of the plurality of transmitters using the effective symbol vectors of the plurality of transmitters, the rotation matrix, a perturbation vector, and a modulo operator.

The perturbation vector may correspond to a perturbation vector generated using the cell index, the rotation matrix, the effective symbol vector of the target transmitter, and the inverse matrix of the channel matrix from the target transmitter to the target receiver.

The modulo operator may correspond to a modulo operator set using a Euclidean distance of the effective symbol vectors.

According to yet another aspect of the present invention, there is provided a communication apparatus of a transmitter for interference cancellation in a communication system having a multi-cell interference channel, the communication apparatus including a rotation matrix calculation unit to calculate a rotation matrix for transforming channel matrices from a plurality of transmitters to a plurality of receivers into a block upper triangular matrix, for interference alignment, an effective symbol vector identification unit to identify effective symbol vectors corresponding to data symbol vectors of the plurality of transmitters using the rotation matrix, and a transmit signal generation unit to generate a transmit signal of a target transmitter using the effective symbol vector of the target transmitter and the block upper triangular matrix, to pre-cancel interference corresponding to a transmit signal of a neighboring transmitter.

The rotation matrix calculation unit may include a neighboring transmitter rotation matrix receiving unit to receive information associated with a rotation matrix of the neighboring transmitter, a target transmitter rotation matrix identification unit to identify a rotation matrix of the target transmitter using the rotation matrix of the neighboring transmitter and the channel matrices from the target transmitter to the plurality of receivers, and a rotation matrix identification unit to identify a rotation matrix for transforming the channel matrices from the plurality of transmitters to the plurality of receivers into a block upper triangular matrix using the rotation matrix of the target transmitter.

The effective symbol vector identification unit may include a data symbol vector identification unit to identify the data symbol vectors of the plurality of transmitters, and an effective symbol vector calculation unit to calculate effective symbol vectors of the plurality of transmitters using the rotation matrix and the data symbol vectors.

The transmit signal generation unit may include an inverse matrix calculation unit to calculate an inverse matrix of the block upper triangular matrix, an identification unit to identify information associated with the transmit signal of the neighboring transmitter and at least one interference channel matrix of the neighboring transmitter, an interference pre-cancellation unit to pre-cancel interference corresponding to the transmit signal of the neighboring transmitter using the effective symbol vector of the target transmitter, the information associated with the transmit signal of the neighboring transmitter, and the at least one interference channel matrix of the neighboring transmitter, a transmit signal calculation unit to calculate the transmit signal of the target transmitter using information associated with the pre-cancelled interference and an inverse matrix of a channel matrix from the target transmitter to a target receiver, a modified effective symbol vector identification unit to identify modified effective symbol vectors of the plurality of transmitters using the effective symbol vectors, and a transmit signal extraction unit to extract the transmit signal of the target transmitter using the modified effective symbol vectors.

The modified effective symbol vector identification unit may include a cell index identification unit to identify a cell index using a plurality of diagonal channel matrices of the block upper triangular matrix, and a modified effective symbol vector operation unit to operate the modified effective symbol vectors of the plurality of transmitters using the effective symbol vectors of the plurality of transmitters, the rotation matrix, a perturbation vector, and a modulo operator.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
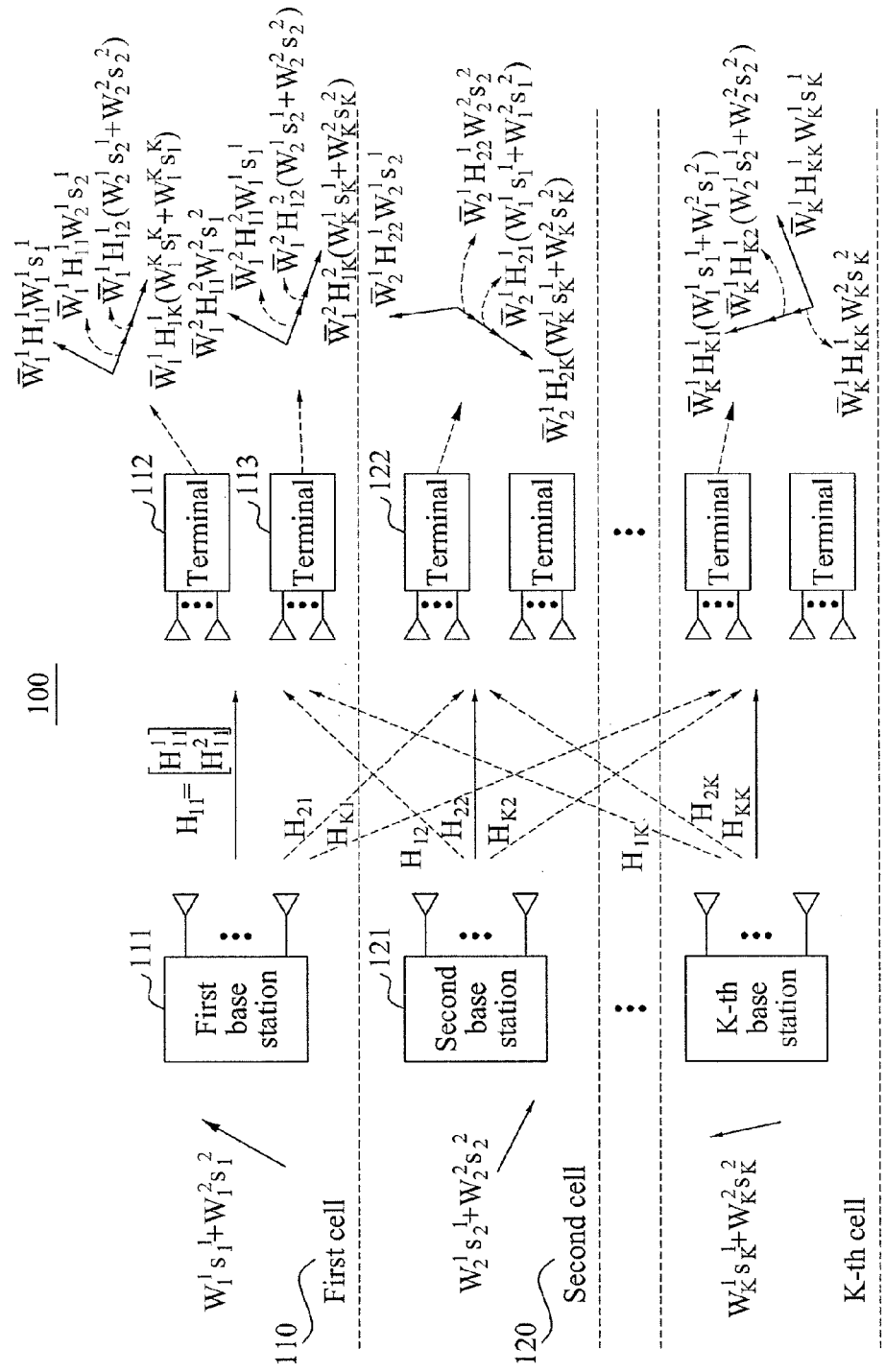
FIG. 1 illustrates a multi-cell multi-user multiple-input multiple-output (MIMO) interference channel according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates a multi-cell multi-user multiple-input multiple-output (MIMO) interference channel according to an exemplary embodiment of the present invention.

Referring to FIG. 1, an interference channel 100 according to an embodiment of the present invention includes a plurality of cells. The interference channel 100 is a channel enabling a plurality of pairs of transmission/reception terminals to communicate with each other using an identical frequency resource.

According to an embodiment of the present invention, in each of the plurality of cells, a plurality of terminals in which multiple antennas are installed communicate with a single base station. Here, the base station may communicate with the plurality of terminals included in a same cell using multiple antennas installed in the base station.

In this instance, the base station generally includes transmission terminals serving a data transmission function in a cell. For example, the base station may include an access point (AP) transmitting received data.

Hereinafter, the present embodiment supposes that the interference channel 100 includes K number of cells, each of which includes two terminals, that is, two users. As a person skilled in the art to which the present invention pertains may readily generalize exemplary embodiments based on the foregoing for a case in which at least three terminals are present in each cell, the present invention is not limited to the following embodiments.

Further, the base station included in the each cell may transmit different types of data to terminals in the same cell. For example, in a first cell 110, a first base station 111 may transmit the different types of data to a terminal 112 and a terminal 113. By way of example, a description below is provided for a case in which the base station in the each cell includes M number of antennas and each terminal includes N number of antennas.

In this example, a channel from a base station in a k-th cell to a j-th terminal in an i-th cell is defined as $H_{ik}^j$. In the present embodiment, $H_{ik}^j$ may be an N×M matrix.

Further, a signal received by the j-th terminal in the i-th cell, $y_i^j$, may be defined by Equation 1.

$$y_i^j = \sum_{k=1}^{K} H_{ik}^j x_k + n_i^j, \quad [\text{Equation 1}]$$

where $n_i^j$ denotes a noise vector received by the j-th terminal in the i-th cell, and $x_k$ denotes a precoded signal transmitted by the base station in the k-th cell. According to exemplary embodiments of the present invention, a transmission terminal transmits the precoded signal so that a reception terminal serves interference alignment in the MIMO interference channel 100. The interference alignment is a linear precoding technique that attempts to align interference signals in time, frequency, or space.

That is, $x_k$ may include precoded signals transmitted by the base station in the k-th cell to terminals in the same cell respectively. Here, in the present embodiment, $x_k$ may be an M×1 matrix and be defined by Equation 2.

$$x_k = \sum_{j=1}^{2} W_k^j s_k^j, \quad [\text{Equation 2}]$$

where $W_k^j$ denotes a precoding matrix for a j-th terminal in the k-th cell and $s_k^j$ denotes a m-dimensional symbol vector transmitted to the j-th terminal in the k-th cell. Exemplary embodiments of the present invention relate to a method of determining $W_k^j$ by the transmission terminal so that the reception terminal serves the interference alignment, providing a technique of decreasing time complexity in computing $W_k^j$.

Here, $y_i^j$ may be represented by Equation 3 based on Equations 1 and 2.

$$y_i^j = H_{ii}^j W_i^j s_i^j + \sum_{\substack{j'=1 \\ j' \neq j}}^{2} H_{ii}^j W_i^{j'} s_i^{j'} + \sum_{\substack{k'=1 \\ k' \neq i}}^{K} \sum_{j'=1}^{2} H_{ik'}^j W_{k'}^{j'} s_{k'}^{j'} + n_i^j. \quad [\text{Equation 3}]$$

Accordingly, a signal to interference and noise ratio (SINR) of the j-th terminal in the i-th cell may be defined by Equation 4:

$$\frac{\|\overline{W}_i^j H_{ii}^j W_i^j s_i^j\|^2}{\sum_{\substack{j'=1 \\ j' \neq j}}^{2} \|\overline{W}_i^j H_{ii}^j W_i^{j'} s_i^{j'}\|^2 + \sum_{\substack{k'=1 \\ k' \neq i}}^{K} \sum_{j'=1}^{2} \|\overline{W}_i^j H_{ik'}^j W_{k'}^{j'} s_{k'}^{j'}\|^2 + \sigma_n^2}, \quad [\text{Equation 4}]$$

where $\sigma_n^2$ denotes noise power and $\overline{W}_i^j$ denotes a decoding matrix.

However, according to Equation 4, the SINR of the j-th terminal is dependent on a precoding matrix of another terminal, that is, $W_k^{j'}$, $j' \neq j$. For example, an SINR of the terminal 112 in the first cell is dependent on a precoding matrix of the terminal 113 in the first cell.

In this case, $W_k^{j'}$, $j' \neq j$ to maximize the SINR of the j-th terminal may be obtained through a complex feedback mechanism. Accordingly, an operation of calculating $W_k^{j'}$, $j' \neq j$ to maximize the SINR of the j-th terminal has high computational complexity.

In exemplary embodiments of the present invention, a signal to leakage and noise ratio (SLNR) is used instead of the SINR, thereby decreasing computational complexity involved in determining the precoding matrix.

First, an SLNR according to an exemplary embodiment of the present invention may be defined by Equation 5.

$$\frac{\|H_{ii}^j W_i^j s_i^j\|^2}{\sum_{\substack{j'=1 \\ j' \neq j}}^{2} \|H_{ii}^{j'} W_i^j s_i^j\|^2 + \sum_{\substack{k'=1 \\ k' \neq i}}^{K} \sum_{j'=1}^{2} \|H_{k'i}^{j'} W_i^j s_i^j\|^2 + \sigma_n^2}. \quad [\text{Equation 5}]$$

Here, the SINR represents a ratio of signal power to combined noise and interference power in a terminal, that is, a reception terminal, while the SLNR represents a ratio of signal power with respect to a target terminal for data transmission to signal leakage power imposed on terminals other than the target terminal plus noise power in a base station, that is, a transmission terminal.

According to Equation 5, the SLNR of the j-th terminal is dependent on the precoding matrix of the j-th terminal, that is, $W_i^j$. Thus, $W_i^j$ to maximize the SLNR of the j-th terminal may be computed without a complicated feedback mechanism.

Here, $W_i^j$ may be computed using a matrix pair $H_{ii}^{jH} H_{ii}^j$, $(H_{ii}^{-jH} H_{ii}^{-j} + N_r \sigma_{ii}^2 I)$.

More particularly, generalized eigenvalues may be extracted by applying generalized eigenvalue decomposition to $H_{ii}^{jH}H_{ii}^{j},(H_{ii}^{-jH}H_{ii}^{-j}+N_r\sigma_{ii}^2 I)$, and a eigenvector corresponding to a greatest generalized eigenvalue among the extracted eigenvalues is defined as $W_i^j$.

Here, $H_{ii}^{-j}$ is a matrix obtained by vertically stacking remaining channel matrices, that is, $H_{ik}^{j'}$, or $j' \neq j$, excluding $H_{ii}^j$. For example, consider a case in which the first base station transmits data to the terminal 112 in the first cell. In this case, i and j are "1". Here, $H_{ii}^j$ is a channel matrix between antennas installed in the first base station and antennas installed in the terminal 112.

Thus, $H_{ii}^{-j}$ is a matrix obtained by vertically stacking the remaining channel matrices aside from $H_{ii}^j$, that is, a channel matrix between the antennas installed in the first base station and antennas installed in the terminal 113, a channel matrix between antennas installed in a second base station 121 and the antennas installed in the terminal 112, and a channel matrix between the antennas installed in the second base station 121 and the antennas installed in the terminal 113.

Here, the second base station 121 communicates with at least one terminal 122 in a second cell 120. That is, when the terminals 112 and 113 in the first cell 110 receive a signal transmitted from the second base station 121, the signal transmitted from the second base station 121 is an interference signal.

Hereinafter, a method in which a transmission terminal determines a precoding matrix and a reception terminal determines a decoding matrix according to an exemplary embodiment of the present invention will be described in detail with reference to FIGS. 2 and 3.

Figure 2:
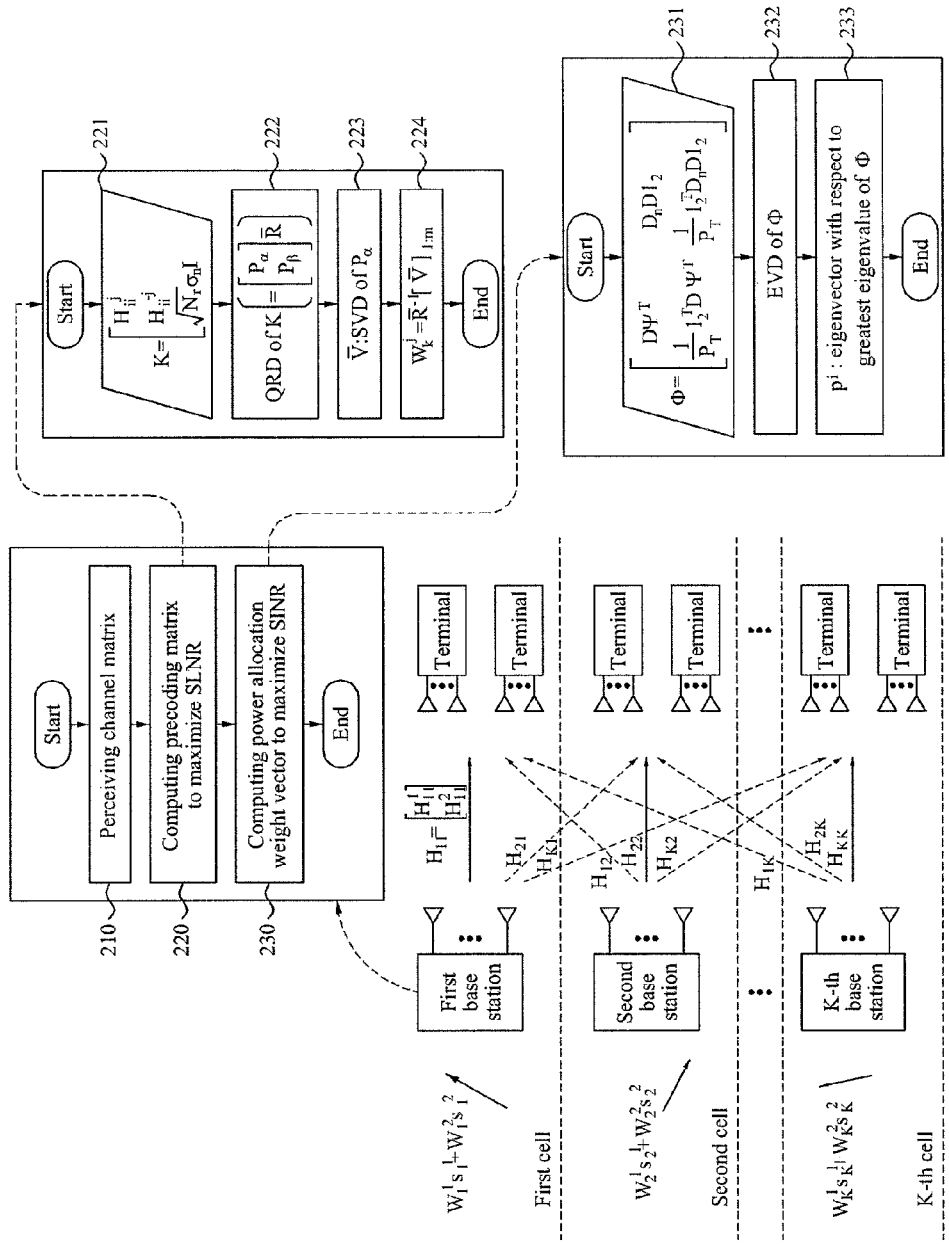
FIG. 2 illustrates a communication method of a first base station according to an exemplary embodiment of the present invention.

FIG. 2 illustrates a communication method of a first base station according to an embodiment of the present invention.

Referring to FIG. 2, a first base station includes detecting a channel matrix in operation 210 and determining a precoding matrix to maximize an SLNR in operation 220.

In the detecting of the channel matrix in operation 210, the first base station detects a channel matrix between antennas installed in a target terminal for data transmission included in a first cell and antennas installed in the first base station. Further, the first base station perceives a channel matrix between the antennas installed in the target terminal and antennas installed in a second base station.

Moreover, in operation 210, the first base station may perceive a channel between antennas installed in individual terminals included in the first cell other than the target terminal and the antennas installed in the first base station and a channel matrix between the antennas installed in the other terminals and the antennas installed in the second base station.

In the end, the first base station detects a channel between the terminals included in the first cell and the first base station and a channel between the terminals in the first cell and the second base station. That is, the first base station may not need to detect a channel between terminals in a second cell and the first base station or channels between the terminals in the second cell and other base stations. Accordingly, the first base station according to the present embodiment may compute a precoding matrix broadly.

Further, in the determining of the precoding matrix in operation 220, the first base station may use a generalized singular value decomposition (GSVD) algorithm in order to obtain a precoding matrix efficiently.

Here, in operation 221, the first base station generates a matrix K based on the detected channel matrices and a noise component in the target terminal. In operation 222, the first base station extracts a first QR factor and a second QR factor by applying QR decomposition to the matrix K. The first base station extracts a first singular value factor by applying singular value decomposition (SVD) to the first QR factor in operation 223, and compute a precoding matrix based on the second QR factor and the first singular value factor in operation 224. The algorithm is illustrated in detail in Algorithm 1.

[Algorithm 1]

1) Set $K = \begin{bmatrix} H_{ii}^j \\ H_{ii}^{-j} \\ \sqrt{N_r}\sigma_n I \end{bmatrix}$ 2) Compute the QRD of $K\left( = \begin{bmatrix} P_\alpha \\ P_\beta \end{bmatrix} \overline{R} \right)$ 3) Compute $\overline{V}$ from the SVD of $P_\alpha$, i.e., $P_\alpha = \overline{U}\overline{\Sigma}\overline{V}^H$.

4) $W_k^j = \overline{R}^{-1}[\overline{V}]_{1:m}$.

That is, the first QR factor and the second QR factor each are $P_\alpha$ and $\overline{R}$, and the first singular value factor is $\overline{V}$. In the present embodiment, $P_\alpha$ may be an N×M matrix. Further, $[A]_{1:m}$ is a submatrix obtained by selecting from a first column to an m-th column from a matrix A.

Here, since the GSVD algorithm, that is, Algorithm 1 does not require iterative operations, and thus an operation for Algorithm 1 has low computational complexity.

As described above, $H_{ii}^{j'}$ is a matrix obtained by vertically stacking remaining channel matrices, that is, $H_{ik}^{j'}$, k'≠i, or j'≠j, excluding $H_{ii}^j$. That is, the first base station does not need information on the channel between the second base station and the terminals in the second cell in order to implement Algorithm 1. That is, in exemplary embodiments of the present invention, information on a channel between a base station and terminals in each cell may not need to perform sharing with other base stations.

In addition, the first base station may further include determining a power allocation weight vector in order to maximize an SINR in operation 230.

In the determining of the power allocation weight vector in operation 230, the first base station may control power for transmitting data to the respective terminals in the first cell, thereby additionally improving performance of a communication system.

Here, the first base station may determine a precoding matrix for performing communication with each of the other terminals than the target terminal among the terminals in the first cell. The precoding matrix for first base station to transmit data to the other terminals in the first cell may be determined in the same manner as in determining of the precoding matrix for the first base station to transmit data to the target terminal in the first cell, and thus a repeated description thereof will be omitted herein for conciseness.

Moreover, the first base station may detect a precoding matrix for the second base station to transmit data to the individual terminals in the second cell. As described above, a plurality of base stations included in a plurality of cells, respectively, may compute precoding matrices for transmitting data to terminals in a cell of each base station, broadly. Thus, in the determining of the power allocation weight vector in operation 230, the first base station may receive information on a precoding matrix for the second base station to transmit data to the respective terminals in the second cell from the second base station.

Subsequently, in operation 231, the first base station may compute a Psi matrix based on the detected matrices, the computed precoding matrices, and precoding matrices transmitted from remaining base stations, for example, the second base station. In operation 232, the first base station may extract a plurality of eigenvalues by applying eigenvalue decomposition to the Psi matrix. In operation 233, the first base station may compute the power allocation weight vector using an eigenvector corresponding to a greatest eigenvalue among the eigenvalues in order to maximize the SLNR of the target terminal in the first cell.

More particularly, a power vector allocated by a base station in an i-th cell to terminals in the i-th cell is defined as $p^i=[p_1^i, p_2^i]$. Since each cell includes two terminals, $p^i$ has two elements. However, as described above, the present embodiment may be generalized to a case in which each cell includes three or more terminals.

In this case, an SINR of a j-th terminal in the i-th cell may be represented by Equation 6.

$$SINR_j^i = \frac{p_j^i \|\overline{W}_i^j H_{ii}^j W_i^j s_i^j\|^2}{\sum_{\substack{j'=1 \\ j' \neq j}}^{2} p_{j'}^i \|\overline{W}_i^j H_{ii}^j W_i^{j'} s_i^{j'}\|^2 + \sum_{\substack{k'=1 \\ k' \neq i}}^{K} \sum_{j'=1}^{2} p_{j'}^{k'} \|\overline{W}_i^j H_{ik'}^j W_{k'}^{j'} s_{k'}^{j'}\|^2 + \sigma_n^2}.$$  [Equation 6]

Further, maximization of a minimum SINR may be formulated by Equation 7.

$$\text{maximize } \min_j \frac{p_j^i \|\overline{W}_i^j H_{ii}^j W_i^j s_i^j\|^2}{\sum_{\substack{j'=1 \\ j' \neq j}}^{2} p_{j'}^i \|\overline{W}_i^j H_{ii}^j W_i^{j'} s_i^{j'}\|^2 + \sum_{\substack{k'=1 \\ k' \neq i}}^{K} \sum_{j'=1}^{2} p_{j'}^{k'} \|\overline{W}_i^j H_{ik'}^j W_{k'}^{j'} s_{k'}^{j'}\|^2 + \sigma_n^2}$$  [Equation 7]

$$\text{subject to } \sum_{j=1}^{2} p_j^i \leq P_T,.$$

Here, a solution to Equation 7 may be obtained by setting $SINR_1^i = SINR_2^i = C_0$ and $p_1^i + p_2^i = P_T$ as expressed in Equations 8 and 9.

$$\frac{1}{C_0} p^i = D\Psi^T p^i + D_n D 1_2,$$  [Equation 8]

where $$1_2 = \begin{bmatrix} 1 \\ 1 \end{bmatrix}.$$

$$\frac{1}{C_0} = \frac{1}{P_T} 1_2^T D\Psi^T p^i + \frac{1}{P_T} 1_2^T D_n D 1_2,$$  [Equation 9]

where $$D^{-1} = \begin{bmatrix} |\overline{W}_i^1 H_{ii}^1 W_i^1|^2 & 0 \\ 0 & |\overline{W}_i^2 H_{ii}^2 W_i^2|^2 \end{bmatrix},$$

$$D^{-1} = \begin{bmatrix} |\overline{W}_i^1 H_{ii}^1 W_i^1|^2 & 0 \\ 0 & |\overline{W}_i^2 H_{ii}^2 W_i^2|^2 \end{bmatrix},$$

and $$D_n = \begin{bmatrix} \sigma^2 + \sum_{\substack{k'=1 \\ k' \neq i}}^{K} \sum_{j'=1}^{2} p_{j'}^{k'} \|\overline{W}_i^1 H_{ik'}^1 W_{k'}^{j'}\|^2 & 0 \\ 0 & \sigma^2 + \sum_{\substack{k'=1 \\ k' \neq i}}^{K} \sum_{j'=1}^{2} p_{j'}^{k'} \|\overline{W}_i^2 H_{ik'}^2 W_{k'}^{j'}\|^2 \end{bmatrix}.$$

A characteristic equation for eigenvalue decomposition is represented by Equation 10 using Equations 8 and 9.

$$\frac{1}{C_0}\begin{bmatrix} p \\ 1 \end{bmatrix} = \Phi \begin{bmatrix} p \\ 1 \end{bmatrix},$$ [Equation 10]

$$\Phi = \begin{bmatrix} D\Psi^T & D_n D 1_2 \\ \frac{1}{P_T} 1_2^T D\Psi^T & \frac{1}{P_T} 1_2^T D_n D 1_2 \end{bmatrix}.$$

Here, a solution to Equation 10 may be obtained by extracting at least one eigenvalue through application of eigenvalue decomposition to a matrix $\Phi$ and selecting an eigenvector corresponding to a greatest eigenvalue among the extracted eigenvalues. That is, the first base station may set the eigenvector corresponding to the greatest eigenvalue of $\Phi$ as the power allocation weight vector.

Figure 3:
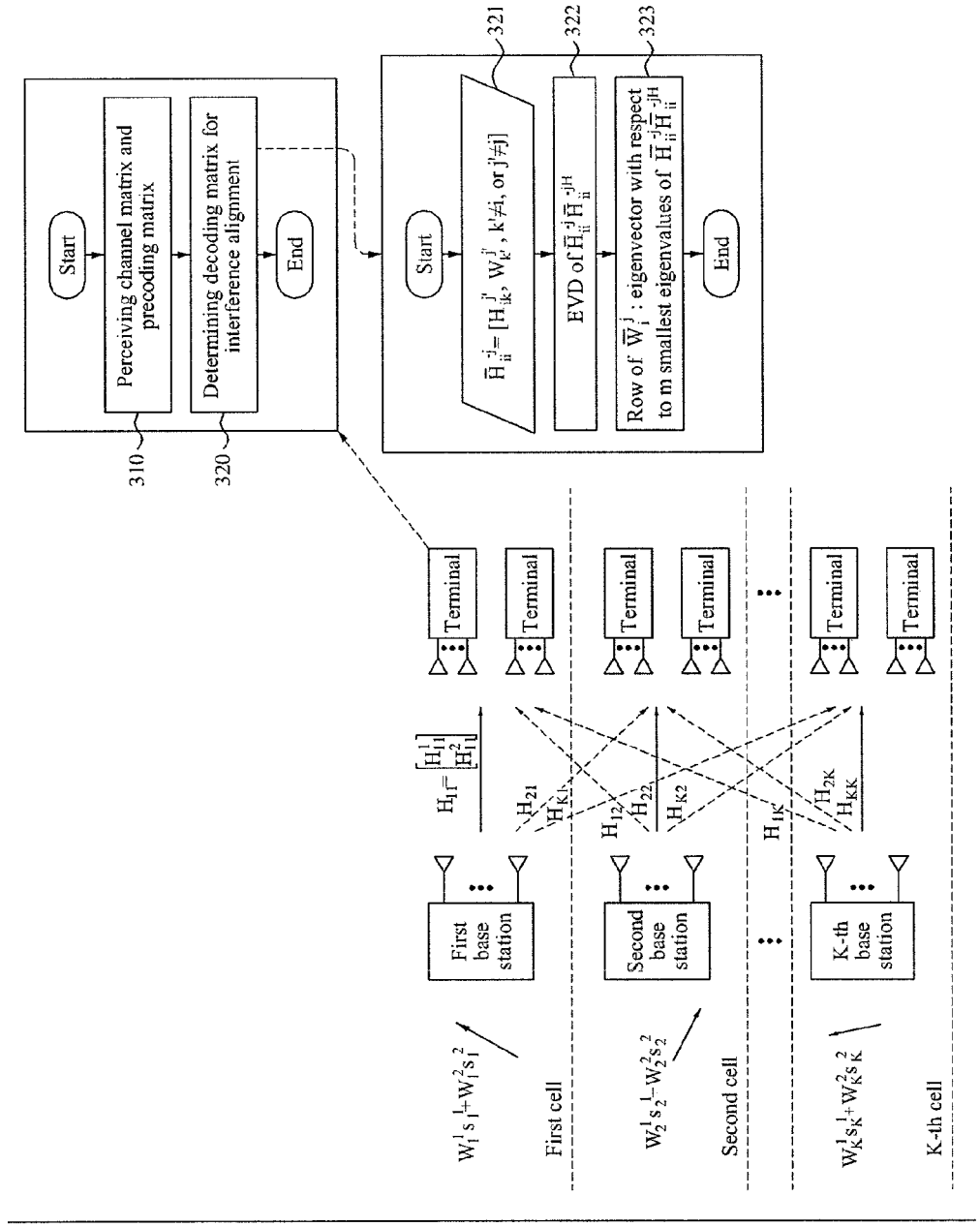
FIG. 3 illustrates a communication method of a terminal according to an exemplary embodiment of the present invention.

FIG. 3 illustrates a communication method of a terminal according to an exemplary embodiment of the present invention.

Referring to FIG. 3, a terminal in a first cell, hereinafter referred to as a "first terminal", according to the present embodiment may include detecting a channel matrix and a precoding matrix in operation 310 and determining a decoding matrix for interference alignment in operation 320.

In the detecting of the channel matrix and the precoding matrix in operation 310, the first terminal detects a channel matrix between antennas installed in a second base station and antennas installed in the first terminal. Further, the first terminal detects a channel matrix between antennas installed in terminals in the first cell other than the first terminal and antennas installed in a first base station and a channel matrix between the antennas installed in the other individual terminals and the antennas installed in the second base station. Furthermore, the first terminal may detect a precoding matrix used for communication between the first base station and each of the other terminals and a precoding matrix used for communication between the second base station and each of terminals included in the second cell.

In addition, in the determining of the decoding matrix in operation 320, when the precoding matrix is determined by the first base station, the first terminal may determine the decoding matrix using orthogonal vectors to span a null space orthogonal to effective channels of individual interference signals in the first terminal. Using the decoding matrix, the first terminal may eliminate unwanted interference signals from received signals.

More particularly, in operation 321, the first terminal generates a matrix Q based on the detected channel matrices and the detected precoding matrices. In operation 322, the first terminal may extract a plurality of eigenvalues by applying of eigenvalue decomposition to the matrix Q. In operation 323, then, the first terminal may generate the decoding matrix using eigenvectors corresponding m smaller eigenvalues among the eigenvalues.

Here, according to the present embodiment, m may be a number of antennas installed in a transmission terminal, M. Further, the matrix Q is $\overline{H}_{ii}^{-J} \overline{H}_{ii}^{-JH}$ and $\overline{H}_{ii}^{-J} = [H_{ik'}{}^{j'}, W_{k'}{}^{j'}, k' \neq i,$ or $j' \neq j]$. That is, the first terminal sets eigenvectors corresponding to the m number of smallest eigenvalues of $\overline{H}_{ii}^{-J} \overline{H}_{ii}^{-JH}$ as a row of the decoding matrix, thereby determining the decoding matrix.

Figure 4:
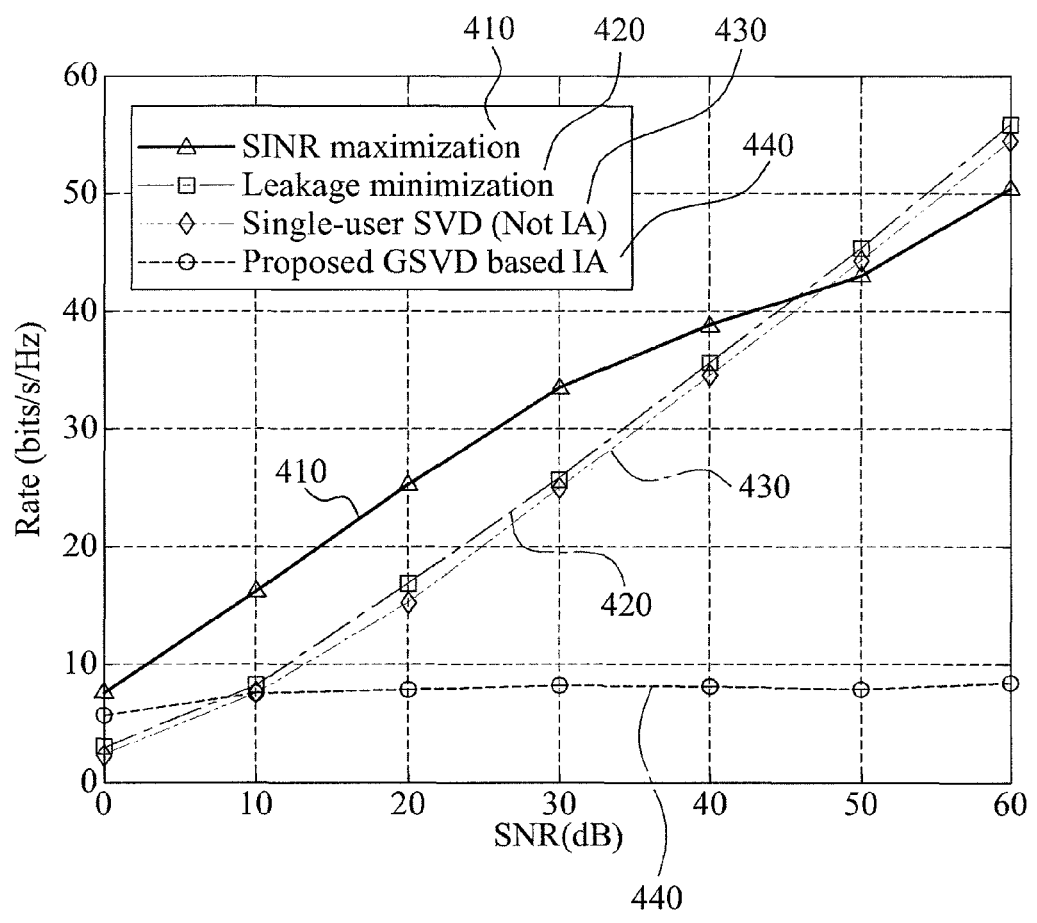
FIGS. 4 and 5 illustrate effects according to exemplary embodiments of the present invention.
Figure 5:
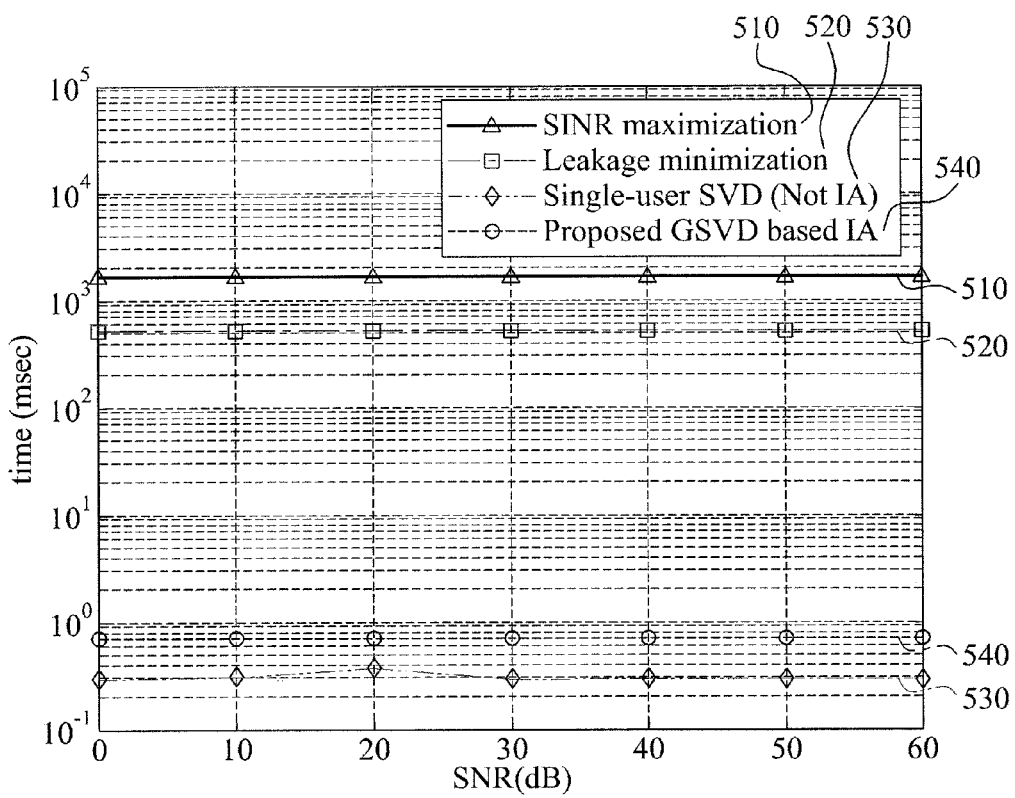

FIGS. 4 and 5 illustrate effects according to exemplary embodiments of the present invention.

Referring to FIG. 4, a multi-cell multi-user MIMO interference channel according to an exemplary embodiment of the present invention includes three pairs of transmission terminals, for example, base stations, and terminals, for example, reception terminals. Here, a description is provided for a case in which transmission terminal and reception terminal use six antennas each.

A communication method 410 according to an exemplary embodiment of the present invention performs at a similar achievable rate under a variety of SNR conditions when compared to conventional interference alignment techniques 420, 430 and 440.

Referring to FIG. 5, a communication method 510 according to an exemplary embodiment of the present invention may reduce an amount of computation time required by about 1000 times when compared to conventional interference alignment techniques 520, 530 and 540, because the communication method according to the exemplary embodiments of the present invention does not involve iterative operations and a need to share channel information between each transmitter and a receiver with another transmitter is absent. Thus, broad and independent computation of a precoding matrix is enabled.

Figure 6:
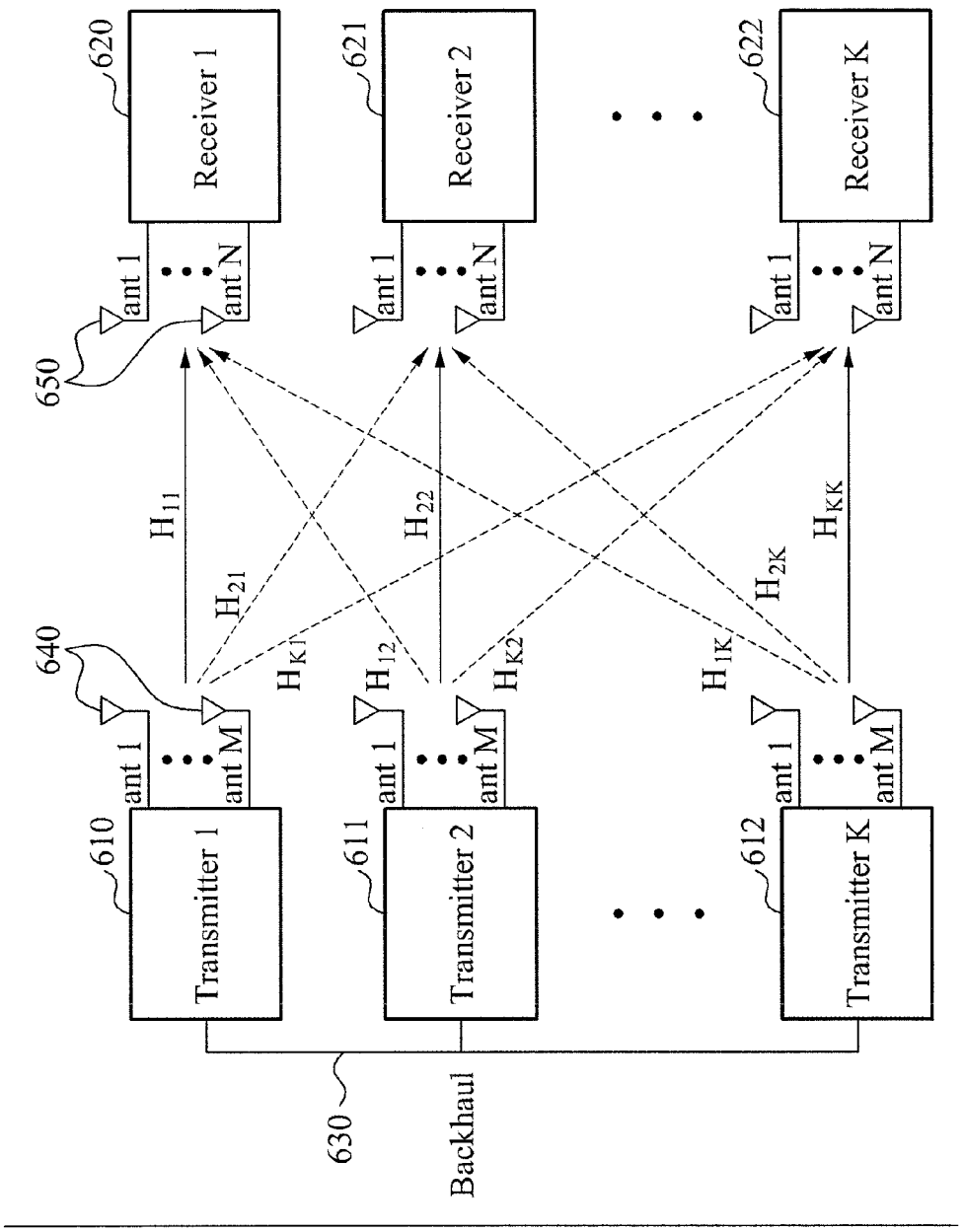
FIG. 6 illustrates multi-user multi-cell interference including a plurality of transmitter and a plurality of receivers.

FIG. 6 illustrates multi-user multi-cell interference including a plurality of transmitter and a plurality of receivers.

Referring to FIG. 6, a communication system may have a multi-cell interference channel for communication between a plurality of transmitter and a plurality of receivers provided with multiple antennas. Each transmitter may transmit a signal to the receivers using M transmitting antenna 640. Also, each receiver may receive a signal using N receiving antenna 650.

The plurality of transmitters may include eNodeBs, remote radio equipment (RRE), or femto cell APs, in a long-term evolution (LTE) network. Also, the plurality of transmitters may include 802.11 or 802.16 base stations.

Within one cell, each transmitter may communicate with each receiver on a one to one basis. For example, a first transmitter 610 may communicate with a first receiver 620, and a K-th transmitter 612 may communicate with a K-th receiver 622. However, the transmitter may be extended to a multi-user environment for communication with a plurality of receivers.

Also, an exemplary embodiment may be applicable to an X channel for data transmission cross transmitters. For example, the first transmitter 610 may transmit data to a second receiver 621 as well as the first receiver 620. Similarly, a second transmitter 611 may transmit an independent data to the first receiver 620 and the second receiver 621.

In an exemplary embodiment, a channel $H_{11}$ may be used for communication between the first transmitter 610 and the first receiver 620. In a multi-user environment, the first transmitter 610 may communicate with the second receiver 621 and the K-th receiver 622. In this case, the first transmitter 610 may communicate with the second receiver 621 using an interference channel $H_{21}$. Similarly, the first transmitter 610 may communicate with the K-th receiver 622 using an interference channel $H_{K1}$.

Accordingly, in an exemplary embodiment, a channel $H_{AB}$ may be used for communication between a target transmitter and a target receiver. Here, a subscript A denotes a number of a receiver, and a subscript B denotes a number of a transmitter. When A and B have the same value, $H_{AB}$ may correspond to a channel in use for communication the target transmitter and the target receiver. When A and B have different values, $H_{AB}$ may correspond to an interference channel of the target transmitter.

The plurality of transmitters may share simple channel information and a data symbol vector using a backhaul 630. The backhaul 630 may refer to a connection line between each transmitter and a transmission line.

In an exemplary embodiment, the interference channel may be cancelled using interference alignment and interference pre-cancellation. In a communication system with a multi-cell interference channel, a communication capacity may be increased when the interference channel is cancelled. Also, a multiplexing gain or DOF may be improved. In this case, the multiplexing gain or DOF may be defined as a gain obtained by transmitting a plurality of data streams through a plurality of channels. In a case of general interference alignment, a multiplexing gain or DOF may have MK/2 maximum. Here, M denotes a number of antennas of a terminal, and K denotes a number of cells.

A communication method for interference cancellation may be applicable when K denotes a general number as well as 2. A further detailed description of a communication method for interference cancellation when K is 2 is provided with reference to FIG. 7, and a further detailed description of a communication method for interference cancellation when K is a general number is provided with reference to FIGS. 8 through 10.

Figure 7:
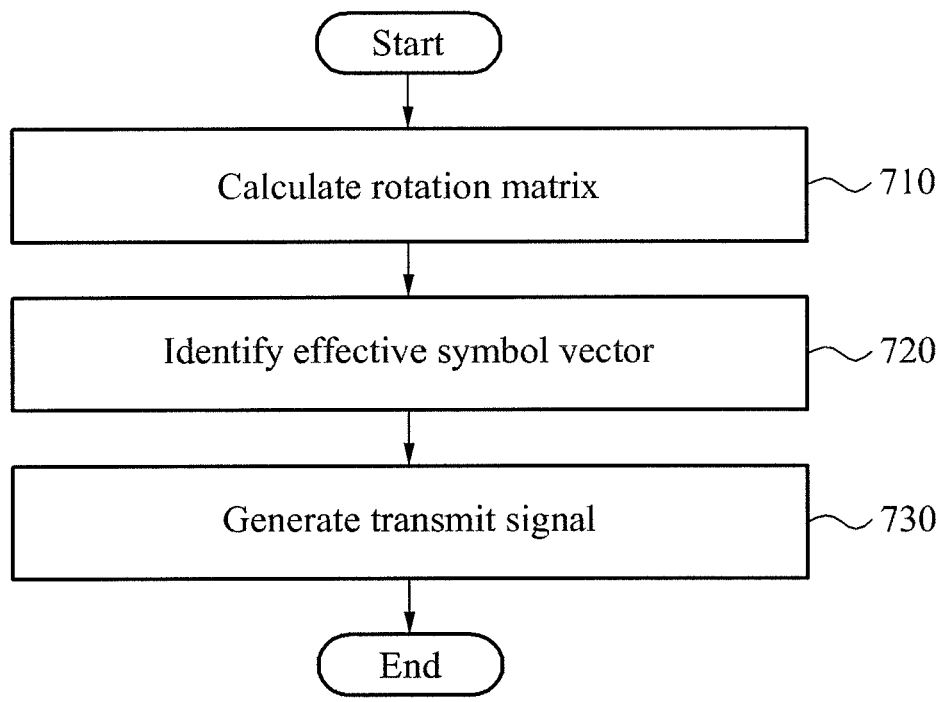
FIG. 7 is a flowchart illustrating a communication method for interference cancellation according to an exemplary embodiment of the present invention.

FIG. 7 is a flowchart illustrating a communication method for interference cancellation according to an exemplary embodiment of the present invention.

Referring to FIG. 7, in operation 710, the communication method for interference cancellation according to an exemplary embodiment of the present invention may compute a rotation matrix for transforming channel matrices from a plurality of transmitters to a plurality of receivers into a block upper triangular matrix, for interference alignment.

When a number K of cells is 2, a signal being received by each receiver may be defined by Equation 11.

$$y_1 = H_{11}x_1 + H_{12}x_2 + n_1$$

$$y_2 = H_{21}x_1 + H_{22}x_2 + n_2 \quad \text{[Equation 11]}$$

where $H_{ij}$ denotes a channel matrix from a transmitter j to a receiver i, $x_j$ denotes a transmit signal vector at the transmitter j, and $n_i$ denotes a noise vector at the receiver i. To perform interference alignment on a plurality of channel matrices from a plurality of transmitters to a plurality of receivers, the plurality of channel matrices may be transformed into a block upper triangular matrix. The interference alignment may refer to a technique that may align all interference signals within one half of a given dimensional signal space and may enable communication in the other half of the signal space absent interference, to improve the total system capacity. Accordingly, the communication method for interference cancellation may align diagonal elements of the block upper triangular matrix into a channel matrix from a target transmitter to a target receiver, and may align all the elements above the diagonal into an interference channel matrix. Also, the communication method for interference cancellation may align all the elements below the diagonal into zero.

The communication method for interference cancellation may implement a given rotation or a plane rotation for $H_{21}$ to be aligned. In this case, the assumption may be that each transmitter may identify a channel to each receiver using feedback.

Accordingly, the communication method for interference cancellation may implement $$G \begin{bmatrix} H_{11} \\ H_{21} \end{bmatrix} = \begin{bmatrix} H_{11}^{(1)} \\ 0 \end{bmatrix}$$

at a first transmitter. When the first transmitter transmits a rotation angle, that is, minimal information for determining a rotation matrix G, to a second transmitter through a backhaul, the second transmitter may obtain a modified channel matrix $$G \begin{bmatrix} H_{12} \\ H_{22} \end{bmatrix} = \begin{bmatrix} H_{12}^{(1)} \\ H_{22}^{(1)} \end{bmatrix}.$$

In particular, channel matrices from a plurality of transmitters to a plurality of receivers may be provided in a form of $$G \begin{bmatrix} H_{11} & H_{12} \\ H_{21} & H_{22} \end{bmatrix} = \begin{bmatrix} H_{11}^{(1)} & H_{12}^{(1)} \\ 0 & H_{22}^{(1)} \end{bmatrix}.$$

Here, the rotation matrix G may correspond to a unitary matrix. Accordingly, the channel matrices from the plurality of transmitters to the plurality of receivers may be represented by Equation 12.

$$\begin{bmatrix} H_{11} & H_{12} \\ H_{21} & H_{22} \end{bmatrix} = G^H \begin{bmatrix} H_{11}^{(1)} & H_{12}^{(1)} \\ 0 & H_{22}^{(1)} \end{bmatrix} \quad \text{[Equation 12]}$$

In operation 720, the communication method for interference cancellation may identify effective symbol vectors corresponding to data symbol vectors of the plurality of transmitters using the rotation matrix.

The data symbol vector desired to be transmitted from the plurality of transmitters to the plurality of receivers may be expressed by $$\begin{bmatrix} s_1 \\ s_2 \end{bmatrix}.$$

In this case, the plurality of transmitters may share the data symbol vector through the backhaul. Since the plurality of transmitters identify the rotation matrix and the data symbol vector, the communication method for interference cancellation may identify an effective symbol vector that may be represented by Equation 13.

$$\begin{bmatrix} \tilde{s}_1 \\ \tilde{s}_2 \end{bmatrix} = G \begin{bmatrix} s_1 \\ s_2 \end{bmatrix} \quad \text{[Equation 13]}$$

In operation 730, the communication method for interference cancellation may generate a transmit signal of a target transmitter using the effective symbol vector of the target transmitter and the block upper triangular matrix, to pre-cancel interference corresponding to a transmit signal of a neighboring transmitter.

An inverse matrix of the block upper triangular matrix may be expressed by Equation 14.

$$\begin{bmatrix} H_{11} & H_{12} \\ H_{21} & H_{22} \end{bmatrix}^{-1} = \qquad \text{[Equation 14]}$$

$$\begin{bmatrix} H_{11}^{(1)} & H_{12}^{(1)} \\ 0 & H_{22}^{(1)} \end{bmatrix}^{-1} G = \begin{bmatrix} (H_{11}^{(1)})^{-1} & -(H_{11}^{(1)})^{-1}H_{12}^{(1)}(H_{22}^{(1)})^{-1} \\ 0 & (H_{22}^{(1)})^{-1} \end{bmatrix} G$$

That is, to pre-cancel interference corresponding to the transmit signal of the neighboring transmitter, the first transmitter may generate a transmit signal that may be represented by Equation 15, and the second transmitter may generate a transmit signal that may be represented by Equation 16.

$$\bar{x}_1 = (H_{11}^{(1)})^{-1}\bar{s}_1 - (H_{11}^{(1)})^{-1}H_{12}^{(1)}(H_{22}^{(1)})^{-1}\bar{s}_2 \qquad \text{[Equation 15]}$$

$$\bar{x}_2 = (H_{22}^{(1)})^{-1}\bar{s}_2 \qquad \text{[Equation 16]}$$

When the first transmitter generates the transmit signal of Equation 15, the first transmitter may transmit different 2M data due to an inverse transform effect of a channel $$\begin{bmatrix} H_{11} & H_{12} \\ H_{21} & H_{22} \end{bmatrix}.$$

In a case of conventional interference alignment, a multiplexing gain or DOF is M (=MK/2, K=2) maximum, however, the communication method for interference cancellation may have an effect of improving the performance twice as much.

Also, the transmit signal of the first transmitter may be expressed by Equation 17.

$$\begin{aligned}
\bar{x}_1 &= (H_{11}^{(1)})^{-1}\bar{s}_1 - (H_{11}^{(1)})^{-1}H_{12}^{(1)}(H_{22}^{(1)})^{-1}\bar{s}_2 \\
&= (H_{11}^{(1)})^{-1}\left(\bar{s}_1 - H_{12}^{(1)}(H_{22}^{(1)})^{-1}\bar{s}_2\right) \\
&= (H_{11}^{(1)})^{-1}\left(\bar{s}_1 - H_{12}^{(1)}\bar{x}_2\right)
\end{aligned} \qquad \text{[Equation 17]}$$

Accordingly, the transmit signal $\bar{x}_1$ of the first transmitter may need channel matrix information $H_{12}^{(1)}$ and $(H_{22}^{(1)})^{-1}$ of AP2, however the transmit signal of the first transmitter may be generated using information $H_{12}^{(1)}\bar{x}_2$ of the second transmitter based on Equation 17.

Also, to generate transmit signals of a plurality of transmitters, channel matrix may be transformed inversely as presented by Equations 16 and 17. In this instance, noise enhancement may occur to the transmit signals. To overcome this phenomenon, the transmit signals may be generated using a modified effective symbol vector.

The modified effective symbol vector may be expressed by Equation 18.

$$\begin{bmatrix} \bar{s}'_1 \\ \bar{s}'_2 \end{bmatrix} = G\begin{bmatrix} s_1 + \tau l_1 \\ s_2 + \tau l_2 \end{bmatrix} = \begin{bmatrix} \bar{s}_1 \\ \bar{s}_2 \end{bmatrix} + \tau G l \qquad \text{[Equation 18]}$$

where $\tau$ denotes a modulo operator, and l denotes a perturbation vector. The modulo operator may correspond to a positive real number, and may be set using a Euclidean distance of the effective symbol vectors. The perturbation vector may correspond to a vector including a complex integer, and may be defined by Equation 19.

$$l = \min_{l \in \{z_1 + j z_2 | z_1, z_2 \in \square^{M \times 1}\}} \left\| (H_{kk}^{(1)})^{-1}(\bar{s}_k + [G]_{(1:M)+M(k-1)}l) \right\|^2 \qquad \text{[Equation 19]}$$

where k denotes an arbitrary cell index and may be set to be an index of a cell having a smallest norm of diagonal elements of the block upper triangular matrix. Also, a symbol $[A]_{i,j}$ denotes a sub-matrix formed by taking an i-th row through a j-th row from a matrix A.

Accordingly, the modified effective symbol vector of Equation 18 may be calculated using the effective symbol vectors of the plurality of transmitters, the rotation matrix, the perturbation vector, and the modulo operator.

When the plurality of transmitters generate the transmit signals using the modified effective symbol vector, the receiver may improve a signal to noise ratio (SNR) and a signal to interference plus noise ratio (SINR).

Figure 8:
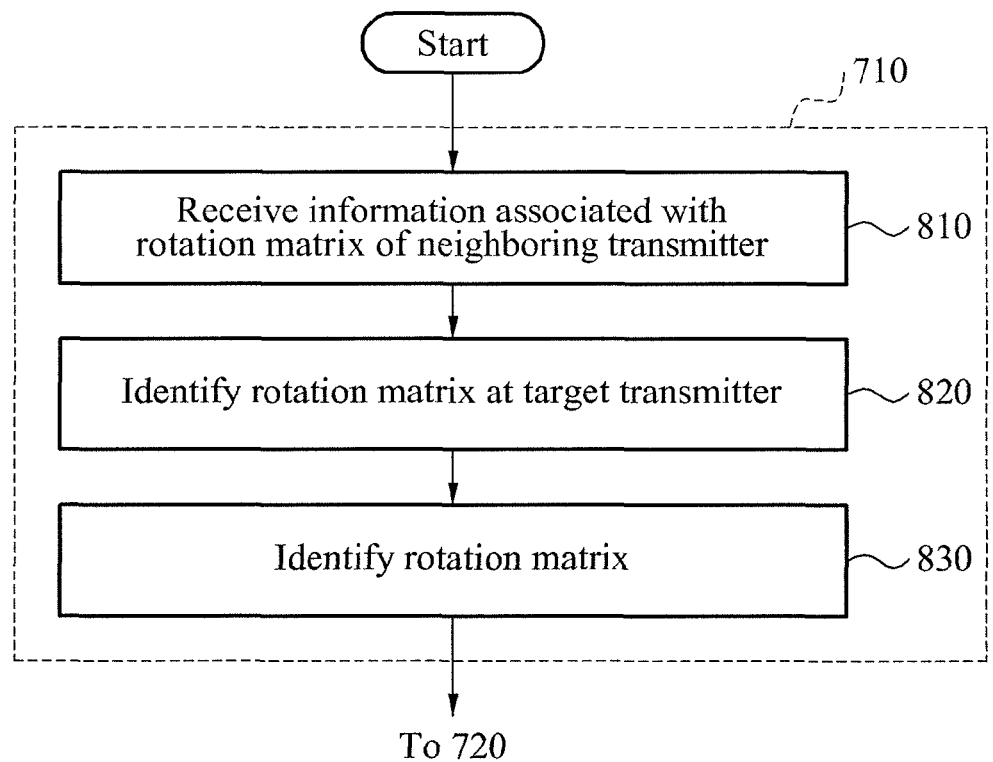
FIG. 8 is a flowchart illustrating operation 710 in the method of FIG. 7.

FIG. 8 is a flowchart illustrating operation 710 in the method of FIG. 7.

Referring to FIG. 8, in operation 810, operation 710 may receive information associated with a rotation matrix of a neighboring transmitter.

The communication method for interference cancellation may be applicable to a general number K of cells. Accordingly, received signals of the plurality of receivers may be represented by Equation 20.

$$\begin{aligned}
y_1 &= H_{11}x_1 + \ldots + H_{1K}x_K + n_1 \\
&\vdots \qquad\qquad \vdots \\
y_K &= H_{K1}x_1 + \ldots + H_{KK}x_K + n_K
\end{aligned} \qquad \text{[Equation 20]}$$

In this case, the communication method for interference cancellation may arrange the channel matrices based on an arrangement standard using an indicator related with the channel. The indicator may include an indicator indicating a condition of a channel, for example, a received signal strength indicator (RSSI)), or an indicator indicating an amplitude of a channel. For example, the communication method for interference cancellation may re-arrange the received signals to sort Frobenius norm of diagonal channel matrice in the block upper triangular matrix in an ascending order.

Also, the communication method for interference cancellation may transform the interference channels in a form of a block upper triangular matrix. The first transmitter as a neighboring transmitter may generate a rotation matrix $G_1$ using $$G_1 \begin{bmatrix} H_{11} \\ H_{21} \\ \vdots \\ H_{K1} \end{bmatrix} = \begin{bmatrix} H_{11}^{(1)} \\ 0 \\ \vdots \\ 0 \end{bmatrix}.$$

Also, in operation 710 information for determining the rotation matrix $G_1$ of the neighboring transmitter may be received, for example, a rotation angle, using the backhaul.

In operation 820, a rotation matrix of the target transmitter may be identified in operation 710 using the rotation matrix $G_1$ of the neighboring transmitter and the channel matrices from the target transmitter to the plurality of receivers. Operation 710 may transform the rotation matrix $G_1$ of the first transmitter as a neighboring transmitter and the channel matrices from the target transmitter, in particular, second transmitter to the plurality of receivers in a form of, for example, $$G_2 G_1 \begin{bmatrix} H_{12} \\ H_{22} \\ \vdots \\ H_{K2} \end{bmatrix} = \begin{bmatrix} H_{12}^{(1)} \\ H_{22}^{(2)} \\ \vdots \\ 0 \end{bmatrix},$$

using a Givens rotation. Accordingly, a rotation matrix $G_2$ of the target transmitter may be identified in operation 710.

In operation 830, a rotation matrix for transforming the channel matrices may be identified in operation 710 from the plurality of transmitters to the plurality of receivers into a block upper triangular matrix using the rotation matrix of the target transmitter. The rotation matrix may be identified in operation 710 using $G=G_{K-1} \ldots G_2 G_1$. Accordingly, the entire channel matrix using the rotation matrix may be represented based on Equation 21, operation 710.

$$\begin{bmatrix} H_{11} & \cdots & H_{1K} \\ \vdots & \ddots & \vdots \\ H_{K1} & \cdots & H_{KK} \end{bmatrix} = G^H \begin{bmatrix} H_{11}^{(1)} & H_{12}^{(1)} & \cdots & H_{1K}^{(1)} \\ 0 & H_{22}^{(2)} & & \vdots \\ \vdots & & \ddots & H_{K-1K}^{(K-1)} \\ 0 & \cdots & 0 & H_{KK}^{(K-1)} \end{bmatrix} \quad \text{[Equation 21]}$$

In the block upper triangular matrix of Equation 21, diagonal elements denote a channel matrix from the target transmitter to the target receiver, and elements above the diagonal denote an interference channel matrix from the target transmitter to at least one receiver.

Figure 9:
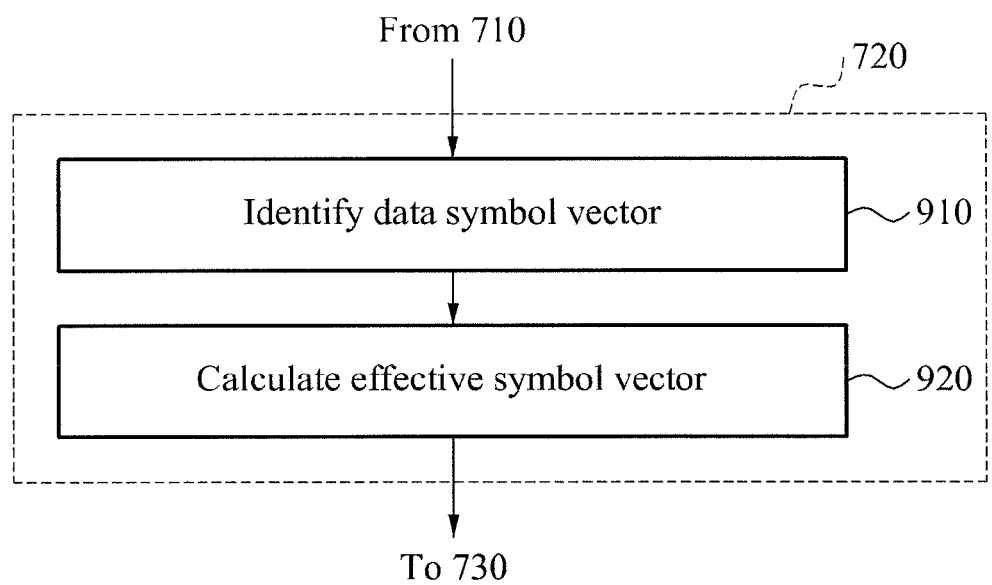
FIG. 9 is a flowchart illustrating operation 720 in the method of FIG. 7.

FIG. 9 is a flowchart illustrating operation 720 in the method of FIG. 7.

Referring to FIG. 9, in operation 910, data symbol vectors of the plurality of transmitters may be identified in operation 720. The data symbol vector may correspond to a representation of data desired to be transmitted from the target transmitter to the target receiver in a form of a vector.

In operation 920, effective symbol vectors of the plurality of transmitters may be calculated using the rotation matrix and the data symbol vectors in operation 720. The effective symbol vector may be expressed by Equation 22.

$$\begin{bmatrix} \bar{s}_1 \\ \vdots \\ \bar{s}_K \end{bmatrix} = G \begin{bmatrix} s_1 \\ \vdots \\ s_K \end{bmatrix} \quad \text{[Equation 22]}$$

Since the plurality of transmitters share the data symbol vector through the backhaul, the plurality of transmitters may calculate the effective symbol vector that may be represented by Equation 22.

Figure 10:
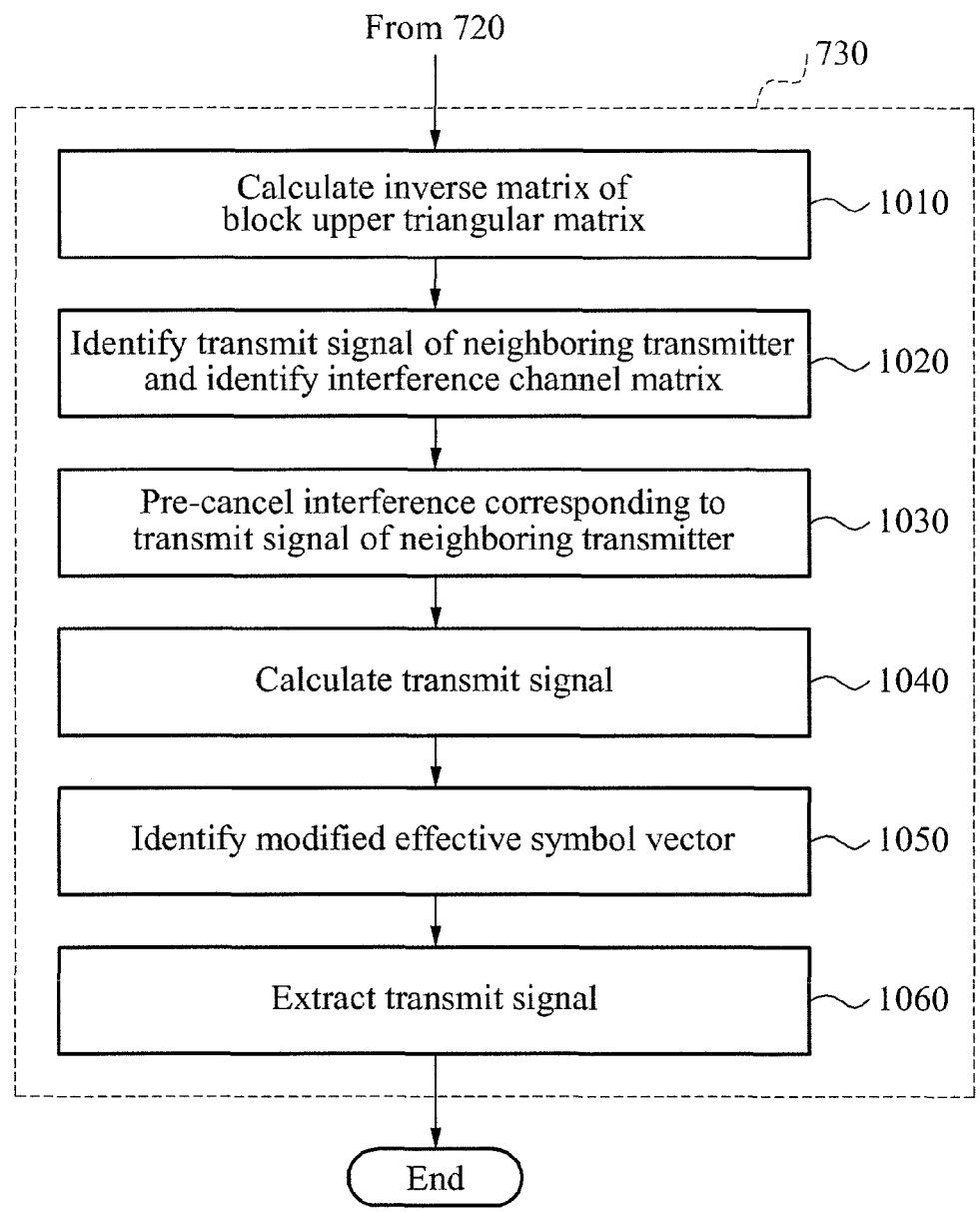
FIG. 10 is a flowchart illustrating operation 730 in the method of FIG. 7.

FIG. 10 is a flowchart illustrating operation 730 in the method of FIG. 7.

Referring to FIG. 10, in operation 1010, an inverse matrix of the block upper triangular matrix may be calculated in operation 730. The inverse matrix of the block upper triangular matrix may be defined by Equation 23.

$$\begin{bmatrix} H_{11} & \cdots & H_{1K} \\ \vdots & \ddots & \vdots \\ H_{K1} & \cdots & H_{KK} \end{bmatrix}^{-1} = \begin{bmatrix} H_{11}^{(1)} & H_{12}^{(1)} & \cdots & H_{1K}^{(1)} \\ 0 & H_{22}^{(2)} & & \vdots \\ \vdots & & \ddots & H_{K-1K}^{(K-1)} \\ 0 & \cdots & 0 & H_{KK}^{(K-1)} \end{bmatrix}^{-1} G \quad \text{[Equation 23]}$$

The inverse matrix of the block upper triangular matrix may involve sharing of channel information between the plurality of transmitters as well as complex calculation. To resolve this issue, a matrix defined by Equation 24 may be used in operation 730.

$$T^{(i)} = \begin{bmatrix} H_{K-iK-i}^{(K-i)} & H^{(i)} \\ 0 & T^{(i-1)} \end{bmatrix}, \quad \text{[Equation 24]}$$

$$T^{(0)} = H_{KK}^{(K-1)},$$

$$H^{(i)} = [H_{K-iK-i+1}^{(K-i)} \cdots H_{K-iK}^{(K-i)}]$$

The matrix may correspond to a sub-matrix of the block upper triangular matrix. When i is 0, the sub-matrix $T^{(i)}$ may include a channel matrix from the K-th transmitter to the K-th receiver as matrix elements. As i increases, a size of the sub-matrix may increase due to a nested structure. Accordingly, when i increases to K−1, the sub-matrix may become the block upper triangular matrix.

The inverse matrix of the block upper triangular matrix may be represented by Equation 25.

$$(T^{(i)})^{-1} = \begin{bmatrix} (H_{K-iK-i}^{(K-i)})^{-1} & -(H_{K-iK-i}^{(K-i)})^{-1} H^{(i)} (T^{(i-1)})^{-1} \\ 0 & (T^{(i-1)})^{-1} \end{bmatrix} \quad \text{[Equation 25]}$$

In this instance, after calculating an inverse matrix of the sub-matrix, the inverse matrix of the block upper triangular matrix may be calculated using a nested structure of the inverse matrix of the sub-matrix. Accordingly, the transmit signal absent sharing of channel information between the plurality of transmitters may be generated in operation 730.

In operation 1020, information associated with the transmit signal of the neighboring transmitter and at least one interference channel matrix of the neighboring transmitter may be identified in operation 730. Operation 730 may identify $H_{ki}^{(k)}\bar{x}_i$ by receiving information associated with the transmit signal of the neighboring transmitter i and information associated with at least one interference channel matrix of the neighboring transmitter i. In this instance, the transmit signal may be generated absent a need to receive all channel matrix information.

In operation 1030, interference corresponding to the transmit signal of the neighboring transmitter using the effective symbol vector of the target transmitter, the information associated with the transmit signal of the neighboring transmitter, and the at least one interference channel matrix of the neighboring transmitter may be pre-cancelled in operation 730. The transmit signal of the target transmitter may be expressed by Equation 26.

$$\overline{x}_k = \left(H_{kk}^{(k)}\right)^{-1}\left(\overline{s}_k - \sum_{i=k+1}^{K} H_{ki}^{(k)}\overline{x}_i\right) \quad \text{[Equation 26]}$$

That is, operation 730 may pre-cancel interference corresponding to the transmit signal of the neighboring transmitter by performing a subtraction operation of subtracting the interference $H_{ki}^{(k)}\overline{x}_i$ corresponding to the transmit signal of the neighboring transmitter from the effective symbol vector of the target transmitter.

In operation 1040, the transmit signal of the target transmitter using the information associated with the pre-cancelled interference and the inverse matrix of the channel matrix from the target transmitter to the target receiver may be calculated in operation 730. For example, the transmit signal of the target transmitter by multiplying the inverse matrix of the channel matrix from the target transmitter to the target receiver by the information associated with the pre-cancelled interference, as represented by Equation 26, may be calculated in operation 730.

In operation 1050, modified effective symbol vectors of the plurality of transmitters may be identified in operation 730 using the effective symbol vectors. To calculate the transmit signal, an inverse matrix of the block upper triangular matrix may be calculated. In this case, noise enhancement may occur to the transmit signal. To overcome this phenomenon, the transmit signal may be generated using the modified effective symbol vector. The modified effective symbol vector may be represented by Equation 27.

$$\begin{bmatrix} \overline{s}'_1 \\ \vdots \\ \overline{s}'_K \end{bmatrix} = G \begin{bmatrix} s_1 + \tau l_1 \\ \vdots \\ s_K + \tau l_K \end{bmatrix} = \begin{bmatrix} \overline{s}_1 \\ \vdots \\ \overline{s}_K \end{bmatrix} + \tau Gl \quad \text{[Equation 27]}$$

where $\tau$ denotes a modulo operator, and $l$ denotes a perturbation vector. The modulo operator may correspond to an arbitrary positive real number, and may be set using a Euclidean distance of the effective symbol vectors.

The perturbation vector may correspond to a vector including a complex integer, and may be defined by Equation 28.

$$l = \min_{l \in \{z_1+jz_2|z_1,z_2 \in \square^{M \times 1}\}} \left\|\left(H_{kk}^{(k)}\right)^{-1}\left(\overline{s}_k + [G]_{(1:M)+M(k-1)}l\right)\right\|^2 \quad \text{[Equation 28]}$$

where k denotes an arbitrary cell index. The cell index may be defined by Equation 29.

$$k = \arg\min_i \|(H_{ii}^{(i)})\|^2 \quad \text{[Equation 29]}$$

Here, the cell index may be set to be an index of a cell having a smallest norm of a diagonal element of the block upper triangular matrix, as shown in Equation 29.

Also, a symbol $[A]_{i,j}$ denotes a sub-matrix formed by taking an i-th row through a j-th row from a matrix A.

Accordingly, the modified effective symbol vectors, for example, represented by Equation 27, may be operated using the effective symbol vectors of the plurality of transmitters, the rotation matrix, the perturbation vector, and the modulo operator. Also, an element vector of $\tau Gl$ in Equation 27 may be removed at the receiver using the modulo operator $\tau$.

In operation 1060, the transmit signal of the target transmitter may be extracted in operation 730 using the modified effective symbol vector.

Accordingly, when the plurality of transmitters generate the transmit signals using the modified effective symbol vector, the receiver may improve a SNR and a SINR.

Figure 11:
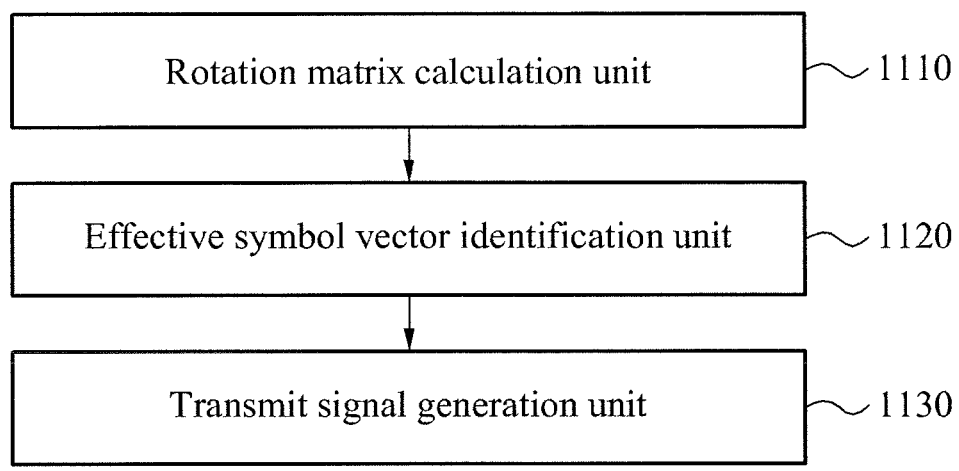
FIG. 11 illustrates a communication apparatus for interference cancellation according to an exemplary embodiment of the present invention.

FIG. 11 illustrates a communication apparatus of a transmitter for interference cancellation according to an exemplary embodiment of the present invention.

Referring to FIG. 11, a rotation matrix calculation unit 1110 may calculate a rotation matrix for transforming channel matrices from a plurality of transmitters to a plurality of receivers into a block upper triangular matrix, for interference alignment.

An effective symbol vector identification unit 1120 may identify effective symbol vectors corresponding to data symbol vectors of the plurality of transmitters using the rotation matrix.

A transmit signal generation unit 1130 may generate a transmit signal of a target transmitter using the effective symbol vector of the target transmitter and the block upper triangular matrix, to pre-cancel interference corresponding to a transmit signal of a neighboring transmitter.

The disclosure provided with reference to FIGS. 6 through 10 may be applied to the communication apparatus of the transmitter for interference cancellation of FIG. 11. Accordingly, a further description is omitted herein for conciseness.

The above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A communication method of a first base station in a first cell communicating with a terminal in the first cell subject to interference by a signal transmitted from a second base station in at least a second cell, the communication method comprising:
    detecting a channel matrix between antennas installed in the terminal and antennas installed in the first base station and a channel matrix between the antennas installed in the terminal and antennas installed in the second base station;
    detecting a channel matrix between antennas installed in at least one remaining terminal in the first cell and the antennas installed in the first base station and a channel matrix between the antennas installed in the at least one remaining terminal and the antennas installed in the second base station; and
    determining a precoding matrix used for communication between the first base station and the terminal based on the channel matrices in order to maximize a signal to leakage and noise ratio (SLNR) with respect to the terminal;

wherein the determining of the precoding matrix comprises:

generating a matrix pair based on the channel matrices and a noise component in the terminal;

extracting at least one generalized eigenvalue by applying generalized eigenvalue decomposition to the matrix pair; and computing the precoding matrix using an eigenvector corresponding to a greatest generalized eigenvalue among the at least one generalized eigenvalue.

2. The communication method of claim 1, further comprising:

determining a precoding matrix used for communication between the first base station and the at least one remaining terminal;

detecting a precoding matrix used for communication between the second base station and at least one terminal present in the second cell; and determining a power allocation weight vector used by the first base station based on the channel matrices and the precoding matrices in order to maximize a signal to interference and noise ratio (SINK) with respect to the terminal.

3. The communication method of claim 2, wherein the determining of the power allocation weight vector comprises:

computing a Psi matrix based on the channel matrices and the precoding matrices;

extracting at least one eigenvalue by applying eigenvalue decomposition to the Psi matrix; and computing the power allocation weight vector using an eigenvector corresponding to a greatest eigenvalue among the at least one eigenvalue.

4. A communication method of a first base station in a first cell communicating with a terminal in the first cell subject to interference by a signal transmitted from a second base station in at least a second cell, the communication method comprising:

detecting a channel matrix between antennas installed in the terminal and antennas installed in the first base station and a channel matrix between the antennas installed in the terminal and antennas installed in the second base station;

detecting a channel matrix between antennas installed in at least one remaining terminal in the first cell and the antennas installed in the first base station and a channel matrix between the antennas installed in the at least one remaining terminal and the antennas installed in the second base station; and determining a precoding matrix used for communication between the first base station and the terminal based on the channel matrices in order to maximize a signal to leakage and noise ratio (SLNR) with respect to the terminal;

wherein the determining of the precoding matrix comprises:

generating a matrix K based on the channel matrices and a noise component in the terminal;

extracting a first QR factor and a second QR factor by applying QR decomposition to the matrix K;

extracting a first singular value factor by applying singular value decomposition to the first QR factor; and computing the precoding matrix based on the second QR factor and the first singular value factor.

5. The communication method of claim 4, further comprising:

determining a precoding matrix used for communication between the first base station and the at least one remaining terminal;

detecting a precoding matrix used for communication between the second base station and at least one terminal present in the second cell; and determining a power allocation weight vector used by the first base station based on the channel matrices and the precoding matrices in order to maximize a signal to interference and noise ratio (SINR) with respect to the terminal.

\* \* \* \* \*